United States Patent [19]

Hauser

[11] Patent Number: 4,862,767
[45] Date of Patent: Sep. 5, 1989

[54] HYDROSTATIC TRANSAXLE

[75] Inventor: Hans Hauser, Strongsville, Ohio

[73] Assignee: Agri-Fab, Inc., Sullivan, Ill.

[21] Appl. No.: 270,398

[22] Filed: Nov. 14, 1988

Related U.S. Application Data

[63] Continuation of Ser. No. 73,997, Jul. 16, 1987, abandoned.

[51] Int. Cl.$^4$ .............................................. F16H 47/04
[52] U.S. Cl. ........................................ 74/687; 74/700; 180/900; 180/305
[58] Field of Search ................ 74/687, 700, 701, 718, 74/730, 681; 180/70.1, 900

[56] References Cited

U.S. PATENT DOCUMENTS

| | | | |
|---|---|---|---|
| 3,311,186 | 3/1967 | Kamlukin | 180/900 X |
| 3,339,662 | 9/1967 | Hanson et al. | 180/70.1 X |
| 3,477,439 | 11/1969 | Hamouz et al. | 180/70.1 |
| 3,613,815 | 10/1971 | Meylink et al. | 180/70.1 X |
| 3,776,325 | 12/1973 | Jespersen | 74/471 X |
| 4,145,883 | 3/1979 | Forster | 180/70.1 X |
| 4,513,834 | 5/1985 | Hayashi et al. | 180/900 X |
| 4,579,183 | 4/1986 | Irikura et al. | 180/70.1 X |
| 4,627,237 | 12/1986 | Hutson | 60/487 |
| 4,679,382 | 7/1987 | Saruhashi et al. | 180/900 X |
| 4,756,208 | 7/1988 | Hayashi et al. | 74/700 |

FOREIGN PATENT DOCUMENTS 266868  11/1986  Japan ........................... 74/687

Primary Examiner—Dwight G. Diehl
Attorney, Agent, or Firm—Woodling, Krost & Rust

[57] ABSTRACT

A hydrostatic transaxle is disclosed that utilizes a removable hydraulic power unit with the power shaft thereto also used as an idler shaft in a double back power loop to reduce the size of the transaxle.

18 Claims, 2 Drawing Sheets

HYDROSTATIC TRANSAXLE

This is a continuation of co-pending application Ser. No. 73,997 filed on July 16, 1987 now abandoned.

FIELD OF THE INVENTION

This invention relates to hydrostatic transaxle units for riding mowers and lawn and garden tractors.

BACKGROUND OF THE INVENTION

Hydrostatic transaxle units are popular with both the manufacturers and consumer users of riding mowers and lawn and garden tractors (tractors). This type of tractor is typified by a vertical shaft engine and a primary emphasis on mowing duties. The tractors normally are not suited for use with heavy ground engaging implements or for high percentage duty cycles. With hydrostatic transaxles in such units, the manufacturer gets a complete all-in-one transaxle needing only a belt to the engine and a control lever to form the entire ground engaging propulsion power unit for the tractor. The consumer gets a relatively simple to use and easy to understand single control for the speed and direction of the tractor. However, hydrostatic transaxles are not perfect. Major limitations to their use include their internal complexity and resultant increased costs (i.e. incorporating both a hydraulic power pack and gears), their size (i.e. both the hydraulic power pack and gears need a certain set space each) and their lack of ease in exchangeability with purely mechanical power units (i.e. different frame design). These limitations restrict the applications and market place acceptance for hydrostatic transaxles.

The present invention is directed towards providing a simple, inexpensive, small, and strong hydrostatic transaxle.

SUMMARY OF THE INVENTION

The present invention is directed to providing an improved hydrostatic transaxle.

It is an object of this invention to simplify hydrostatic transaxles.

It is an object of this invention to reduce the cost of hydrostatic transaxles.

It is an object of this invention to facilitate the repair of hydrostatic transaxles.

It is an object of this invention to increase the market for hydrostatic transaxles.

Other objects and a more complete understanding of the invention may be had by referring to the following specification and drawings in which:

DESCRIPTION OF THE PREFERRED EMBODIMENT

Figure 1:
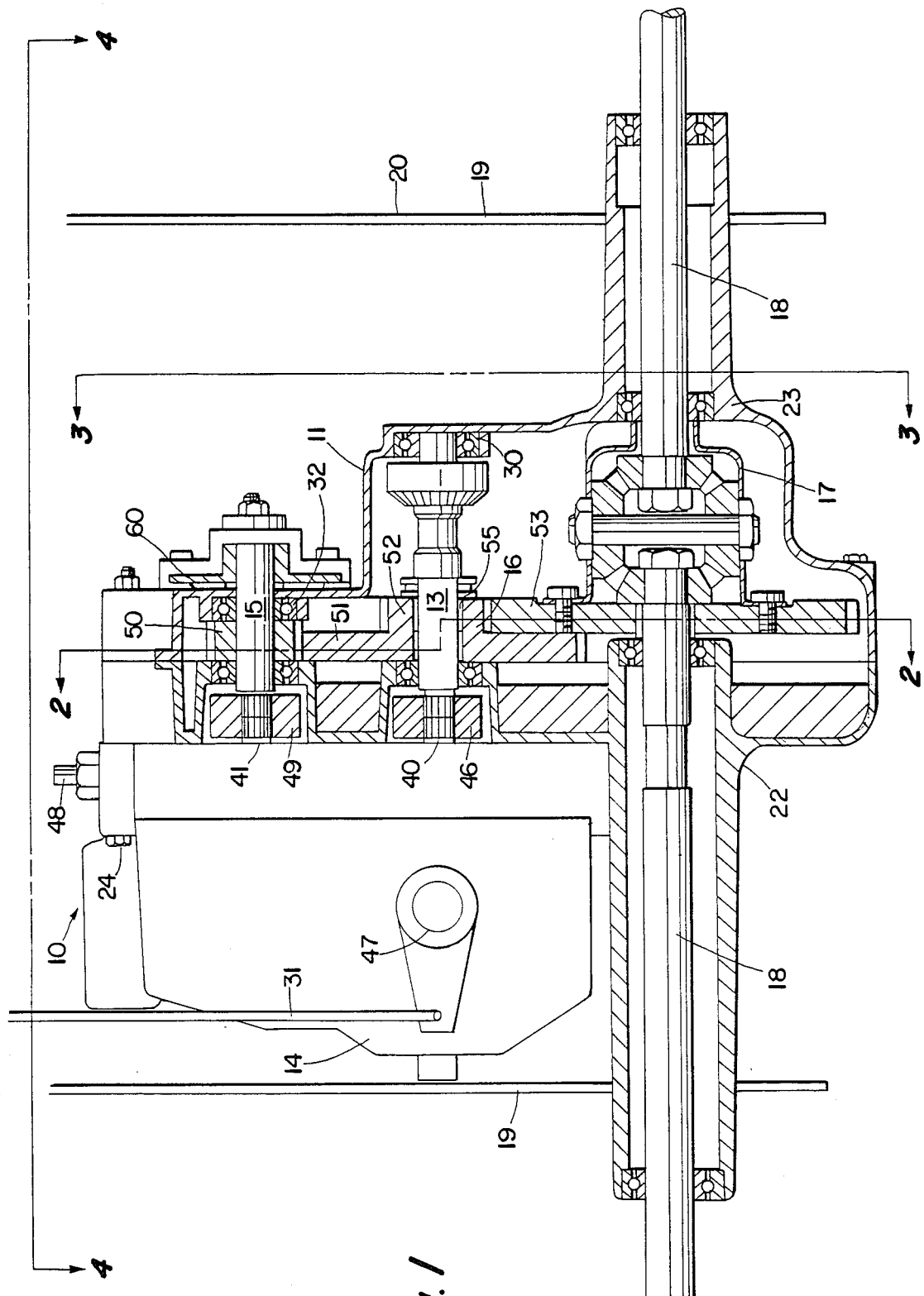
FIG. 1 is a central cross-sectional planar view of a hydrostatic transaxle incorporating the invention, FIG. 2 central longitudinal cross-sectional view of the transaxle of FIG. 1 taken generally along lines 2—2 of that figure.
Figure 2:
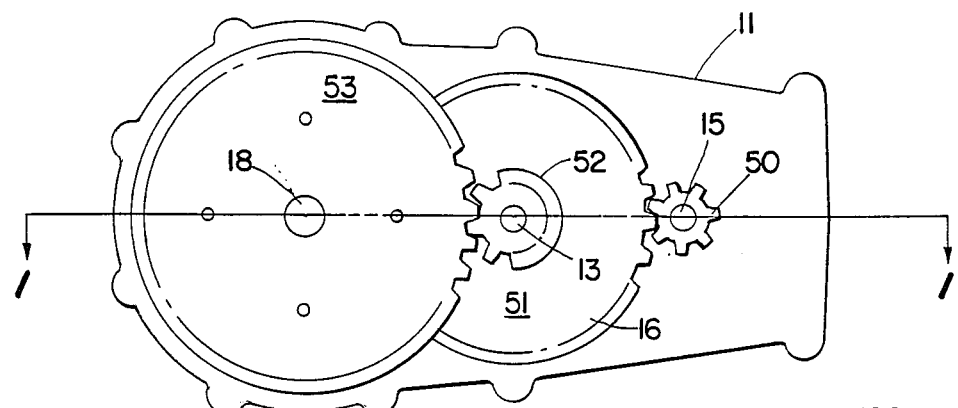
Figure 3:
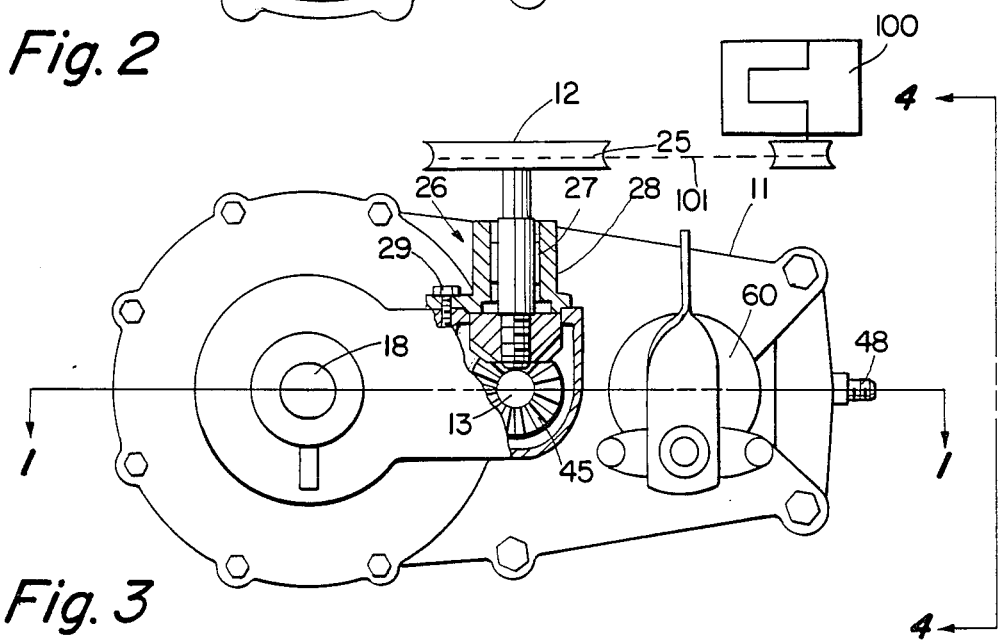
FIG. 3 is a lateral partial cutaway side view of the transaxle of FIG. 1 taken generally from lines 3—3 of that figure.
Figure 4:
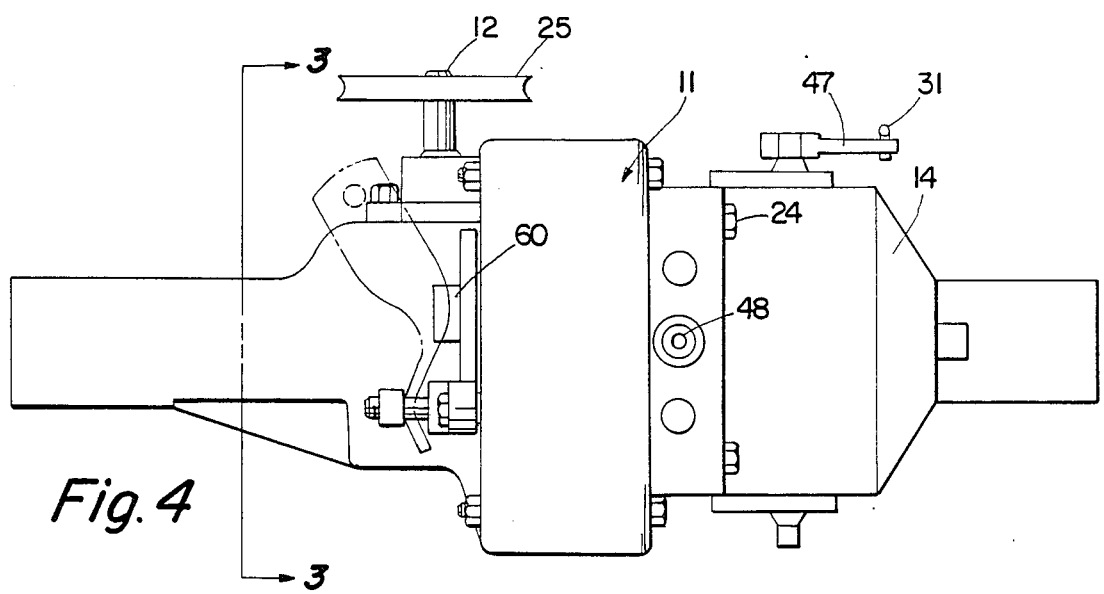
FIG. 4 is a partial front view of the transaxle casing of FIG. 1 taken generally from lines 4—4 of that figure.

This invention relates to an improved hydrostatic transaxle. The invention will be described in the preferred embodiment of a hydrostatic transaxle 10 for lawn and garden tractors. The transaxle 10 includes a casing 11, an input shaft 12, a power/idler shaft 13, a hydrostatic power unit 14, a output/brake shaft 15, an idler gear 16, a differential 17 and output half axle shafts 18.

The casing 11 of the transaxle 10 is designed to mount the transaxle to the tractor frame 19 while retaining all of the parts of the transaxle 10 in their operating positions in respect to each other. The casing 11 shown is constructed of multipart cast aluminum having a vertical parting line between the main deep drawn housing castings 22, 23. This casing 11 is slightly stronger than horizontal parting line casings (at a cost of some more intricate machining). This casing also allows the hydrostatic power unit 14 to be bolted to a single unitary piece 22 eliminating some torque related problems that otherwise might occur. Other casings could also be used. For example a casing for the preferred embodiment disclosed having a horizontal joint through the centerline of the shafts 13, 15 and 18 would reduce the cost of the transaxle (at a cost of some strength) by easing the machining of the casing.

The customary tractor frame 19 in the lawn and garden tractor industry is a generally rectangular inverted "u" shaped cross sectioned steel stamping having a width of perhaps twelve inches between the downwardly extending frame rails 20 and having a length of about four feet. (The frame rails 20 themselves are perhaps eight inches high.) The frame 19 mounts the transaxle in operative position in respect to the vertical shaft engine utilized in lawn and garden tractors. (Lawn and garden tractors are mostly used as lawn mowers. Since a vertical shaft engine has a more efficient connection of power to vertical shaft mowing units than a horizontal shaft engine, vertical shaft engines are normally utilized with such tractors. The invention, however, is not so limited. Other engines including horizontal shaft engines could be utilized with the invention if desired.)

Ordinarily tractors utilizing hydrostatic transaxles have a compromise frame design with similar model tractors having geared transaxles. [A lawn and garden tractor manufacturer has a choice of either designing a single frame for both geared and hydrostatic transaxles—compromising both designs for the sake of the other—or designing two frames—optimizing a single frame per transaxle while increasing the cost of manufacture of the lesser volume unit. Manufacturers customarily chose the compromise design approach, an approach that normally means that the geared transaxle frame design must meet the unique physical size and mounting requirements of the hydrostatic transaxles. As an example of a unique transaxle, the Kanzaki transaxle model K100–K200 has a transversely extending hydrostatic power unit located on top of the mechanical differential/axle unit. This Kanzaki transaxle therefor needs vertical height in the frame rails—vertical height unneeded in a frame designed for an in line shifting, flat pack geared transaxle. A manufacturer designing a single frame for use with both the Kanzaki transaxle and the flat pack geared transaxle would therefor incorporate the frame height of the Kanzaki transaxle into the frame and not the lesser dimension of the geared transaxle. Most other hydrostatic transaxles also have their own unique singular or multiple dimension mounting requirements again not necessarily needed in a geared transaxle frame.] Since most tractors are the lower cost geared transaxle units, the natural result of this design philosophy is to compromise for the many (geared transaxle units) for the sake of the few (hydrostatic transaxle units). The compromise involves more than the cost of the frame; the positioning of associated components to and on the frame must also be compromised. For example a tractor has normally has a battery with the preferred position being in the frame under the drivers seat. The manufacturer mounting this battery to the compromise frame must either have two mounting positions for the battery depending on the nature of the transaxle (since a hydrostatic transaxle could well occupy all the space in the frame leaving no room for the battery at this location) or the manufacturer must make room for the battery in a single spot no matter which transaxle is used (i.e. further compromise the compromise frame with an additional compromise location for the battery—perhaps by moving the seat upwards to mount the battery above the frame). The manufacturer's compromise of the frame design thus is undesirable both on its own merits and for its effect on the rest of the tractor design.

Due to the present invention, a casing 11 of the hydrostatic transaxle 10 incorporating the invention can be made interchangeable with geared transaxles in frames deigned for geared transaxles, even to the extent of using the same mounting holes in the frame and approximately the same transaxle drive pulley location. This significantly increases the manufacturers production flexibility by allowing it to install a hydrostatic transaxle in any frame. This reduces the costs of both manufacture and repair by allowing the frames and other tractor parts to be designed primarily for the higher volume geared transaxle units instead of the lower volume hydrostatic transaxle units. Compromises that are made in the tractor to mount the casing 11 are minimal.

In addition to mounting the transaxle 10 to the tractor frame 19, the casing 11 also retains all of the parts of the transaxle 10 in their operating positions. These parts include the input shaft 12, the power/idler shaft 13, the hydrostatic power unit 14, the output/brake shaft 15, the idler gear 16, the differential 17 and the output/half axle shafts 18.

The input shaft 12 serves to provide the input torque for the hydrostatic transaxle 10. The input shaft 12 shown extends upwardly off of the center portion of the casing 11 between the frame rails 19. This position is approximately the same as in a geared transaxle. The engine for the tractor is mounted on top of the frame. The engine can be located forward of the transaxle (front engine unit) or rearwardly/sidewardly of the transaxle (rear engine unit). A pulley 25 on the input shaft 12 is connected with a belt 101 directly to a pulley on the downwardly extending output of the vertical shaft engine 100. In the embodiment shown, the size of the pulleys is chosen such that the input shaft rotates at approximately 3000 RPM at normal operating speed for the engine (i.e. 3400 to 3600 RPM).

The input shaft 12 is mounted to the casing 11 in its own integral bearing assembly/mounting subassembly 26 by three bolts 29. This subassembly 26 includes the input shaft 12, bearings 27 and a sub-casing 28. By having the sub-casing 28 removable from the main casing 11, the casting of the casing 11 is simplified; the main part 23 of the casing 11 does not have an intermediate inwardly extending tubular section to complicate casting (i.e. avoiding the need for a complex multipart mold or sand casting construction). During the initial construction of the transaxle 10, the casing 11 and input shaft subassembly 26 are both separately assembled. During the final incorporation of the subassembly 26 into the transaxle 10, the subassembly 26 can be shimmed to adjust the bevel gear backlash. After construction the subassembly 26 can be unbolted for internal inspection of the transaxle 10 and for subsequent adjustment (i.e. shimming for compensation for wear). The use of the separate subassembly 26 therefore not only simplifies the initial design and casting of the casing 11 but in addition facilitates the manufacture and repair of the transaxle 10. The input shaft 12 in the subassembly 26 serves to connect the engine to the power shaft 13.

The power/idler shaft 13 serves a dual purpose—a power function to transfer the torque from the engine to the input 40 of the hydrostatic power unit 14 and also an idler function to assist in the transfer of torque from the output 41 of hydrostatic power unit 14 to the differential 17.

In respect to the shafts 13 power function, one end of the power shaft 13 is rotated by the engine to provide a power input for the transaxle 10. In the preferred embodiment shown, this rotation is accomplished via a right angle bevel gear 45 connection to an upwardly extending input shaft 12. The power rotation could also be accomplished directly (as by extending the shaft 13 through the side casing wall to a vertical pulley), indirectly with other input shaft orientations (as by rotating the input shaft 12 ninety degrees to extend through the front casing wall to a longitudinal drive shaft connection with a horizontal shaft engine) or otherwise. The other end of the power shaft 13 is connected to the input 40 of the hydrostatic power unit 14 via a disengageable coupling 46. Ball bearings 30 rotatively support the power shaft 13 to the casing 11.

The hydrostatic power unit 14 is the power transfer means for the transaxle 10. This power unit 14 takes the power of a constantly rotating input 40 and produces a variable speed/direction output 41. The actual speed and direction of the output is dependent on the angle of a control connection to the power unit 14. In the embodiment shown the power unit 14 is a Sundstrand Model No. BDU10S-114 removably mounted onto the side of the casing 11 via bolts 24. This Sundstrand unit has a top or bottom mounted rotary speed and direction control input 47 and a front mounted free wheel release 48 as its main operative controls. The rotary control input 47 is connected to an operator manipulated control lever through shaft 31 for operator control of the speed and direction of the tractor.

The output 41 of the power unit 14 is connected to the output/brake shaft 15 via a disengageable coupling 49. Due to the location of the power unit 14—bolted to the side of the casing 11 disengageably connected between two transaxle shafts 13, 15—the power unit 14 can be separated from the transaxle 10 without any compromise to either the integrity of the transaxle 10 or to the tranaxles operative connections to the frame or engine. This feature allows the hydrostatic power unit 14 to be removed and repaired/replaced in short order.

The output/brake shaft 15 serves a dual purpose—a power function to transfer torque from the output 41 of the power unit 14 to the differential 17 and also a brake function to halt the progress of the tractor over the ground. Ball bearings 32 rotatively support the shaft 15 to the casing 11.

In respect to the output/brake shafts 15 power function, one end of the output shaft 15 is rotated by the output 41 of the power unit 14 to provide torque for the subsequent transaxle gears. The subsequent gears begin with a small output gear 50 fixedly connected to the output shaft 15. This gear 50 in turn rotates the large diameter gear portion 51 of the idler gear 16 with a small diameter gear 52 portion of the idler gear 16 in turn rotating the differential 17 via the ring gear 53.

The gear 16 is rotatively connected to the power/idler shaft 13 through needle bearings 55. The gear 16 is thus able to rotate independently of the shaft 13 in both direction and speed. This relationship accomplishes the idler function of the power/idler shaft 13. By having a single shaft 13 accomplish the two diverse input power and idler shaft functions, the size of the transaxle 10 is reduced from that otherwise possible. This is especially so in the preferred embodiment shown wherein the power shaft 13 is physically located between the power unit driven output shaft 15 and the differential 17.

A disk brake 60 is located on an end of the output/brake shaft 15. This disk brake 60 directly brakes the output 41 of the power unit 14 before the gears of the transaxle 10. This provides for the braking function of the shaft 15. Since the brake is applied before the double reduction gear transaxle, the torque requirements on the brake are reduced. In the embodiment shown, the free wheel control 48 of the hydrostatic power unit 14 is engaged along with the brake 60 in order to avoid undue stress on the power unit 14 and the wear on and decreased performance of the brake 60 that would occur if power was still supplied to the shaft 15 during braking.

The gears 50-53 provide for a double reduction between the power unit 14 and the differential 17. This double reduction is accomplished between in line gears on parallel shafts. There is no need for a high torque right angle drive connection as in the Kanzaki unit nor wasted space due to the inline reduction gearing and 90 degree jackshaft input drive rotation as in the Peerless 1300 transaxle.

The differential 17 is connected to and drives the two half axle shafts 18 in a conventional manner to terminate the power drive of the transaxle 10.

In the preferred embodiment shown, the power shaft 13, output shaft 15 and differential half shafts 18 are located in a single plane. The fact that this could be the separation plane of the casing 11 has already been described. In addition it would be obvious to one skilled in the art that these shafts could be staggered in respect to each other while still retaining most of the advantages of the invention. Additional example: If appropriate, another means could be utilized to connect the idler gear to a driven piece of equipment in the differential and shafts stead. These and other modifications could be made while still remaining within the teachings of this application. Therefore, although this invention has been described in its preferred form with a measure of detail, numerous changes may be made without deviating from the invention as hereinafter claimed.

What is claimed is:

1. An improved hydrostatic transaxle for use in a device having an engine, said transaxle comprising a casing, an output shaft, said output shaft being within said casing, a hydrostatic power unit, said hydrostatic power unit having an input and an output, said input and output being on the same side of said power unit, means to directly attach said power unit to said casing, means to drivingly connect said output of said power unit to said output shaft of said transaxle and means to drivingly connect the engine to said input of said power unit.

2. An improved hydrostatic transaxle for use in a device having an engine, said transaxle comprising a casing, an output shaft, said output shaft being in said casing, a hydrostatic power unit, said hydrostatic power unit having an input and an output, said input and output being on the same side of said power unit, means to attach said power unit to said casing, means to drivingly connect said output of said power unit to said output shaft of said transaxle means to drivingly connect the engine to said input of said power unit, said means to drivingly connect said input of said power unit to the engine including a power shaft, said power shaft being in said casing, means to drivingly connect said power shaft to said input of said power unit and means to drivingly connect the engine to said power shaft.

3. The improved transaxle of claim 2 characterized by the addition of a differential and means to drivingly connect said output shaft to said differential and in that said input to said power unit is located between said output of said power unit and said differential.

4. The improved transaxle of claim 3 characterized in that in said power shaft, output shaft and differential are located in a single plane.

5. The improved transaxle of claim 3 characterized in that said means to drivingly connect said output shaft to said differential includes an idler gear and said idler gear being rotatively mounted on said power shaft.

6. The improved transaxle of claim 2 characterized in that said means to drivingly connect the engine to said power shaft includes an input shaft and said input shaft being located at right angles in respect to said power shaft.

7. The improved transaxle of claim 6 characterized in that said means to drivingly connect said output shaft to said differential includes an idler gear and said idler gear being rotatively mounted on said power shaft.

8. The improved transaxle of claim 7 characterized in that in said power shaft, output shaft and differential are located in a single plane.

9. An improved hydrostatic transaxle for use in a device having an engine, said transaxle comprising a casing, an output shaft, said output shaft being in said casing, a hydrostatic power unit, said hydrostatic power unit having an input and an output, said input and output being on the same side of said power unit, means to attach said power unit to said casing, means to drivingly connect said output of said power unit to said output shaft of said transaxle means to drivingly connect the engine to said input of said power unit, means to drivingly connect said output shaft to said differential and said input to said power unit being located between said output of said power unit and said differential.

10. An improved hydrostatic transaxle for use in a device having an engine, said transaxle comprising a casing, an output shaft, said output shaft being in said casing, a hydrostatic power unit, said hydrostatic power unit having an input and an output, said input and output being on the same side of said power unit, means to attach said power unit to said casing, means to drivingly connect said output of said power unit to said output shaft said transaxle, means to drivingly connect the engine to said input of said power unit, said means to drivingly connect said input of said power unit to the engine including a power shaft, said power shaft being in said casing, means to drivingly connect said power shaft to said input of said power unit, means to drivingly connect the engine to said power shaft and said power shaft, output shaft and differential being located in a single plane.

11. An improved hydrostatic transaxle for use in a device having an engine, said transaxle comprising a casing, a power shaft, said power shaft being in said casing, means to drivingly connect the engine to said power shaft, an output shaft, said output shaft being in said casing, a hydrostatic power unit, said power unit having an input and output, said input and output being on the same side of said power unit, means to attach said power unit to said casing, means to drivingly connect said power shaft to said input of said power unit, means to drivingly connect said output of said power unit to said output shaft, an idler gear, means to rotatively mount said idler gear to said power shaft, means to drivingly connect said output shaft to said idler gear, a differential, means to mount said differential to said casing for rotation in respect thereto, and means to drivingly connect said idler gear to said differential.

12. The improved transaxle of claim 11 characterized in that said power shaft is located between said output shaft and said differential.

13. The improved transaxle of claim 12 characterized in that in said power shaft, output shaft and differential are located in a single plane.

14. The improved transaxle of claim 11 characterized in that said means to drivingly connect the engine to said power shaft includes an input shaft and said input shaft being located at right angles in respect to said power shaft.

15. The improved transaxle of claim 11 characterized by the addition of a brake means connected to said output shaft.

16. An improved hydrostatic transaxle for use in a device having an engine, said transaxle comprising a casing, a power shaft, said power shaft being in said casing, means to drivingly connect the engine to said power shaft, an output shaft, said output shaft being in said casing, a hydrostatic power unit, said power unit having an input and output, said input and output being on the same side of said power unit, means to attach said power unit to said casing, means to drivingly connect said power shaft to said input of said power unit, means to drivingly connect said output of said power unit to said output shaft, an idler gear, means to drivingly connect said output shaft to said idler gear, a differential, means to mount said differential to said casing for rotation in respect thereto, said power shaft being located between said output shaft and said differential, and means to drivingly connect said idler gear to said differential.

17. An improved hydrostatic transaxle for use in a device having an engine, said transaxle comprising a casing, an input shaft, said input shaft being in said casing, means to drivingly connect the engine to said input shaft, a power shaft, said power shaft being in said casing, means to drivingly connect said input shaft to said power shaft, an output shaft, said output shaft being in said casing, a hydrostatic power unit, said power unit having an input and output, said input and output being one the same side of said power unit, means to attach said power unit to said casing, means to drivingly connect said power shaft to said input of said power unit, means to drivingly connect said output of said power unit to said output shaft, an idler gear, means to drivingly connect said output shaft to said idler gear, a differential, means to mount said differential to said casing for rotation in respect thereto said power shaft being located between said output shaft and said differential, and means to drivingly connect said idler gear to said differential.

18. The improved transaxle of claim 17 characterized in that in said power shaft, output shaft and differential are located in a single plane.

* * * * *